United States Patent Office 3,801,537
Patented Apr. 2, 1974

3,801,537
PROCESS FOR IMPROVING PROPERTIES OF VULCANIZED ELASTOMERS
Hermann Westlinning, Kleinostheim, Siegfried Wolff, Cologne, and Werner Schwarze, Frankfurt, Germany, assignors to Deutsche Gold- und Silber-Scheideanstalt vormals Roessler, Frankfurt am Main, Germany
No Drawing. Application Mar. 8, 1971, Ser. No. 122,190, which is a continuation-in-part of abandoned application Ser. No. 715,541, Mar. 25, 1968. Divided and this application Jan. 30, 1973, Ser. No. 328,107
Claims priority, application Germany, Mar. 23, 1967, D 52,613
Int. Cl. C07d 55/20; C08c 11/18, 11/60
U.S. Cl. 260—42.33         5 Claims

ABSTRACT OF THE DISCLOSURE

Vulcanizable elastomeric compositions in which the rubber is a halogen-free polymer and which contain at least one reinforcing filler and sulfur are vulcanized in the presence of an effective amount of at least one substituted s-triazine compound adapted to modify the reinforcing effect of the filler, the said s-triazine compound having the formula

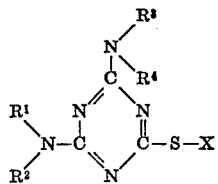

wherein $R^1$, $R^2$, $R^3$ and $R^4$ may be hydroxy or cyano or hydrogen or one of the organic radicals further defined in the specification and

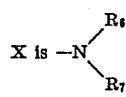

wherein R is alkyl and $R^6$ and $R^7$ are also radicals, principally organic radicals as defined below.

The vulcanizates obtained by the method of the invention are distinguished by longer Mooney scorch times, higher tensile strength and a higher modulus, particularly at 300% elongation, as well as other favorable properties.

CROSS-REFERENCES TO RELATED APPLICATIONS

This application is a division of application Ser. No. 122,190, filed on Mar. 8, 1971, which in turn was a continuation-in-part of application Ser. No. 715,541 filed on Mar. 25, 1968 by the same inventors under the same title, and now abandoned.

BACKGROUND OF THE INVENTION

It is known that the elastomer-filler-interaction can be quantitatively ascertained with elastometers (rheometers). The advantage of this method, in contrast to formerly customary methods, is that the elastomer-filler-interaction can be ascertained separately from the cross-linking density of the polymer according to the following formula $$\alpha_F = \frac{\frac{(D_\infty - D_a) \text{ filled}}{(D_\infty - D_a) \text{ unfilled}} - 1}{mf/mp}$$

in which $D_\infty$ signifies the torque value (mkp) of the vulcanizate at time $t_\infty$
$D_a$ signifies the torque value of the mixture
$(D_\infty - D_a)_{\text{filled}}$ signifies the torque value caused by the cross-linking of a filled vulcanizate
$(D_\infty - D_a)_{\text{unfilled}}$ signifies the torque value caused by the cross-linking of an unfilled vulcanizate
at vulcanization temperature, and $mf$ signifies the concentration of the filler
$mp$ signifies the concentration of the elastomer (Kautschuk and Gummi-Kunstoffe 19th year No. 8/1966, pages 470–474).

The constant $\alpha_F$ comprehends the sum of all influences of a filler on the deformation behavior of the elastomer. As a consequence, $\alpha_F$ depends, on the one hand, on the chemical nature of the elastomeric polymer and, on the other hand, on the filler used. $\alpha_F$, however, is entirely independent of the chemical structure of the cross-linking locations as these are produced with the accelerators used at the present time.

For example, when furnace black is used, the $\alpha_F$ value changes when going from polybutadiene to natural rubber and styrene butadiene rubber from 1.48 to 1.78 and 2.03.

On the other hand, the $\alpha_F$ value changes from 2.03 to 1.80 when going from furnace black to gas black in styrene butadiene rubber.

An increase in the $\alpha_F$ value causes an improvement in the service properties of the vulcanizates.

The invention therefore has the object to improve the service properties of a vulcanized rubber which contains sulfur and a reinforcing filler.

More specifically, it is the object of the invention to provide for a vulcanizing method in which the reinforcement effect of a reinforcing filler present in the vulcanized rubber is improved in the final product.

SUMMARY OF THE INVENTION

The invention resides in a method which comprises vulcanizing a vulcanizable composition containing at least one halogen-free polymeric elastomer, at least one reinforcing filler, sulfur and an effective amount of at least one substituted s-triazine compound adapted to modify the reinforcing effect of the filler, the said s-triazine compound having the formula

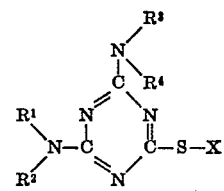

wherein $R^1$ and $R^3$ are each selected from the group consisting of hydrogen, alkyl, alkenyl, cycloalkyl, phenyl, aralkyl and substituted alkyl, alkenyl, cycloalkyl, phenyl and, aralkyl wherein the substituents are selected from the group consisting of —OH, —OR and —CN, R being alkyl with up to 18 carbon atoms,
$R^2$ and $R^4$ are each selected from the group consisting of hydrogen, alkyl, alkenyl, cycloalkyl, phenyl, aralkyl and substituted alkyl, alkenyl, cycloalkyl, phenyl and aralkyl wherein the substituents are selected from the group consisting of —OH, —OR and —CN, R being alkyl with up to 18 carbon atoms, X is selected from the group consisting of hydrogen,

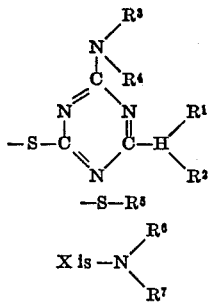

$R^6$ being selected from the group consisting of hydrogen, alkyl, aralkyl and cycloalkyl and $R^7$ being selected from the group consisting of alkyl, aralkyl and cycloalkyl and wherein $R^6$ and $R^7$ together may also form a cycloaliphatic ring having from 5 to 7 carbon atoms in the ring and from 5 to 10 carbon atoms, including lower alkyl, attached to the ring or wherein $R^6$ and $R^7$ may be linked by a member of the group consisting of —O—, —S— and $$-\underset{R^8}{\overset{|}{N}}-$$

and wherein the number of carbon atoms in $R^1$, $R^2$, $R^3$, $R^4$, $R^6$ and $R^7$ is as follows:

alkyl: up to 18 carbon atoms
alkenyl: up to 6 carbon atoms
cycloalkyl: from 5 to 7 carbon atoms
aralkyl: from 7 to 9 carbon atoms.

DESCRIPTION OF THE PREFERRED EMBODIMENTS

According to the invention it was found that the elastomer-filler interaction expressed by the constant $\alpha_F$ and therefore the properties of the vulcanizates can be regulated in these types of rubber and filler by the use of substituted s-triazine compounds as described above as vulcanization agents, the structure of the substituents on the triazine ring being determinative of the change of the $\alpha_F$ value.

While the additives of the invention, the mercaptotriazines, can be used as vulcanizing agents for polychloroprene rubbers, and some of them have been used in that manner, they are in no way superior to conventional vulcanizing agents. One reason is that polychloroprene rubbers cannot be vulcanized with sulfur. Surprisingly, however, when used with natural rubber and halogen-free synthetic elastomers, they have a superior effect on the properties of the vulcanizate. In particular they accomplish products having longer Mooney scorch times and therefore permit easier processing. The vulcanizates also have improved tensile strength and an improved modulus, particularly at 300% elongation.

The polymers used in connection with the process of the present invention are halogen-free sulfur-vulcanizable and double-bond containing homopolymers, copolymers or terpolymers. They may be, for instance, natural rubber (NR), synthetic polyisoprene (IR), polybutadiene and particularly 1,4-cis-polybutadiene (BR), emulsion- or solvent-polymerized copolymers of butadiene with styrene (SBR), copolymers of butadiene with acrylonitrile (NBR), polymers of ethylene and propylene which contain a ter-component containing double bonds such as dicyclopentadiene or ethylidene-norborene (EPDM), and furthermore copolymers of isoprene and isobutylene (IIR).

The reinforcing fillers used in the method of the invention are those which, as indicated, have a favorable effect on the interaction between the elastomers and the fillers. These are particularly carbon blacks, as they are used in the rubber-processing industry, furthermore finely divided materials which contain silica or consist thereof and which may be produced for instance by aqueous precipitation or from the gaseous phase. Furthermore useful are finely divided reinforcing oxides of the metals aluminum, zirconium, zinc and iron.

All carbon blacks can be used in the context of the invention which have a reinforcing effect on the elastomer. Preferable are carbon blacks with a particle size range from 100 A. up to 5000 A. in conventional amounts. Preferably, the amounts are between 5 wt.-parts to 200 wt.-parts for each 100 wt.-parts of the elastomer.

The so-called reinforcing finely divided white fillers can also be employed, particularly those which contain or consist of silica and have a particle size between 100 A. and 3500 A. The amounts are as conventional, preferably between 5 wt.-parts and 200 wt.-parts per 100 wt.-parts of elastomer.

The amount of sulfur is between 1 and 300 mmoles per 100 g. of elastomer.

The amount of the s-triazine compounds is between 0.1 and 50 mmoles per 100 g. of elastomer.

Regarding the sulfur, it will be understood that the amount of sulfur may be adjusted to obtain the desired cross-linking degree. Accordingly, various amounts of sulfur have been used in order to obtain the same cross-linking degree in the examples which follow so as to furnish comparable results regarding the properties obtained in the process of the invention.

The substituted s-triazines employed according to the invention as vulcanizing agents can be prepared by conventional methods.

For instance, the bis-alkyl amino mercapto triazines can, for example, be produced from the corresponding bis-alkyl amino chlorotriazines by reaction with sodium sulfhydrate in suitable solvents, for example, glycol monoethyl ether, or dimethyl formamide, or water in the event the chlorotriazine has sufficient solubility in water.

The disulfides of the mercapto triazines can be produced from the monomercapto triazines by oxidation, for instance, with iodine, hydrogen peroxide, potassium chlorate-sodium nitrate and the like. If mixed disulfides are to be produced, other methods are available. For example, an aromatic sulfene chloride can be reacted with a monomercapto triazine in an inert solvent. Also, the reaction of the sodium salt of the thioester of the sulfuric acid with the sodium salts of mercapto triazines in water can be employed to produce mixed disulfides (Bunte-salts).

The sulfenamides also can be produced by conventional methods, such as, for example, by reaction of triazine sulfene chlorides (produced from the mercapto triazines and chlorine in carbon tetrachloride) with an excess of amine. Also, they can be produced by the oxidation of amine salts of the mercapto triazines with sodium hypochlorite. Preferably, the following amines are employed: diethylamine, dibutylamine, cyclohexylamine, dicyclohexylamine, piperidine and morpholine.

The following will serve to illustrate the production of the substituted triazine compounds employed according to the invention with reference to a number of representative compounds.

(1) 2-ethylamino-4-diethylamino - 6 - mercapto triazine:

112 g. of dry sodium sulfhydrate (sulfohydride) were dissolved in 1500 ml. of glycol monoethyl ether and 299.5 g. of 2-ethylamino-4-diethylamino-6-chloro-s-triazine added thereto while stirring. The mixture was then heated and boiled under reflux for 2 hours. Thereafter the glycol monoethyl ether was distilled off under vacuum and the residue taken up in water, clarified with charcoal and filtered. The mercapto triazine was precipitated from the filtrate with acetic acid. After filtering and drying, 219 g. of the product were obtained in the form of a white powder. Yield was 96.6% of theory.

The following representative monomercapto triazines ($x=H$) were obtained in an analogous manner:

| R₁ | R₂ | R₃ | R₄ | Melting point, °C. |
|---|---|---|---|---|
| H | CH₃ | H | C₃H₇-i | 263 |
| H | C₂H₅ | H | C₃H₇-i | 271 |
| H | C₂H₅ | C₂H₅ | C₂H₅ | 135 |
| H | C₃H₅ | H | C₂H₅ | 270 |
| H | C₃H₇-i | H | CH₂CH₂OH | 240 |
| H | C₆H₅ | H | C₆H₅ | 255–257 |
| CH₃ | C₆H₅ | CH₃ | C₆H₅ | 179 |
| C₂H₅ | C₂H₅ | C₂H₅ | C₂H₅ | 150 |
| H | CH₂CH₂OH | H | CH₂CH₂OH | >280 |
| CH₂CH₂OH | CH₂CH₂OH | CH₂CH₂OH | CH₂CH₂OH | 133–135 |
| H | C₆H₅ | C₂H₅ | C₂H₅ | 186 |
| H | C₁₈H₃₇ | H | C₁₈H₃₇ | 105–110 |
| H | C₂H₅ | H | C₄H₉-i | 245–245 |
| CH₃ | CH₃ | H | C₂H₅ | 250 |
| H | C₄H₉-n | H | C₄H₉-n | 250 |
| C₂H₅ | C₂H₅ | H | C₄H₉-i | 137 |
| H | C₂H₅ | H | C₄H₉-n | 181 |
| C₅H₁₁ | C₅H₁₁ | H | C₂H₅ | 248–250 |
| H | CH₃ | H | CH₂CH₂CH₂OCH₃ | |
| C₂H₅ | C₂H₅ | H | CH₂CH=CH₂ | 166–167 |
| H | C₂H₅ | H | CH₂C₆H₅ | 170–171 |
| H | C₂H₅ | H | CH₂CN | 183–184 |
| H | CH₂CH₂CN | H | CH₂CH₂CN | 191–192 |
| C₂H₅ | C₂H₅ | H | (CH₂)₂OCH₃ | 128–130 |
| C₂H₇ | C₂H₇ | H | (CH₂)₂OCH₃ | 133–135 |
| H | C₅H₁₁ | H | C₅H₁₁ | 294–296 |
| H | C₅H₁₁ | H | H | 278–279 |
| H | C₅H₁₁ | C₅H₁₁ | C₅H₁₁ | 263–265 |
| H | C₂H₅ | H | 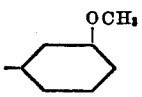 | 224–225 |

(2) Bis-(2-diethylamino - 4 - anilido-triazine - 6 - yl)-disulfide:

27.5 g. of 2-diethylamino-4-anilido-6-mercapto triazine were dissolved in 110 ml. of hot 4% aqueous NaOH and the solution cooled to 20° C. Thereafter, 64 ml. of aqueous sodium hypochlorite (116 g. NaOCl/1000 ml.) were slowly added. A weakly yellow precipitate was soon deposited which was filtered off, washed with dilute NaOH and with water and then dried. 23.5 g. of the desired triazine disulfide having a melting point of 98–100° C. were obtained. The yield was 86% of theory.

Other disulfides of the same type, for example, are the following which were produced in an analogous manner.

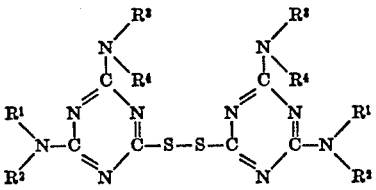

| R¹ | R² | R³ | R⁴ | Melting point, °C. |
|---|---|---|---|---|
| C₄H₉-n | C₄H₉-n | H | C₂H₅ | 128–130 |
| C₂H₅ | C₂H₅ | H | C₂H₅ | 108–110 |
| C₂H₅ | C₂H₅ | C₂H₅ | C₂H₅ | 51–52 |
| C₂H₅ | H | H | C₄H₉-i | 180 |

(3) 2,4-bis-ethylamino-6-n-butyldithio-triazine:

199 g. of 2,4-bis-ethylamino-6-mercapto triazine were dissolved in 2000 ml. of a ½ normal solution of sodium-n-butyl-thiosulfate in H₂O. After several hours a precipitate was formed. The reaction mixture was allowed to stand for a further 24 hours and the precipitate then filtered off, washed and dried under vacuum. 268 g. of the white product of a melting point of 69° C. were obtained. The yield was 93.5% of theory.

(4) 2,4-bis-di-n-butylamine-6-phenyl-dithio-triazine:

36.7 g. of 2,4-bis-di-n-butylamino-6-mercapto triazine were suspended in 250 ml. of carbon tetrachloride and then 14.5 g. of C₆H₅SCl (prepared from thiophenol and chlorine in carbon tetrachloride) were added thereto and the mixture heated while stirring under reflux. The mercapto went into solution with liberation of HCl. The reaction was complete after one hour. After boiling down under vacuum 46.9 grams of a red brown smeary mass were obtained.

Analysis.—For C₂₅H₄₁N₅S₂: Calcd. (percent): S, 15.5; N, 14.7. Found (percent): S, 13.3; N, 14.6.

(5) 2,4-bis-diethylamino-6-benzyl-dithio-triazine:

100 g. of 2,4-bis-diethylamino-6-mercapto-triazine were dissolved in 400 ml. of aqueous 4% NaOH and then 450 ml. of a 1-molar solution of sodium benzyl thiosulfate (C₆H₅CH₂S.SO₃Na) were added all at once. An oil soon separated out which was then shaken out with methylene chloride. After the methylene chloride was distilled off 130.4 g. of a light yellow oil remained as residue.

Analysis.—For C₁₈H₂₇N₅S₂ (mol wt.=377): Calcd. (percent): C, 57.5; H, 7.2; N, 18.6; S, 16.9. Found (percent): C, 57.2; H, 7.3; N, 18.7; S, 17.1.

(6) 2,4-bis-diethylamino - 6 - (benzothiazol - 2 - yl-dithio)-triamine:

50 g. of the sulfone chloride of 2-mercapto-benzo-thiazole (produced from 2-mercapto benzothiazole and chlorine in CCl₄) were added to a solution of 63.5 g. of 2,4-bis-diethylamino-6-mercapto triazine in 500 ml. of CCl₄ and the mixture boiled under reflux for 4 hours. The evolution of HCl was ended and the solvent was distilled off under vacuum. 95 g. of a brown viscous oil remained as a residue. Yield 94% of theory.

Analysis.—For C₁₈H₂₄N₆S₃ (mol wt.=420): Calcd. (percent): C, 51.3; H, 5.7; N, 20; S, 22.9. Found (percent): C, 50.9; H, 5.5; N, 19.7; S, 22.4.

(7) 2,4 - bis - diethylamino - 6 cyclohexylsulfenamido-triazine:

25.4 g. of 2,4-bis-diethylamino-6-mercapto triazine were dissolved in 100 ml. of aqueous 4% NaOH and 10 g. of cyclohexylamine were added thereto. Then 64.5 ml. of aqueous NaOCl (116 g. NaOCl/10 ml. H₂O) were added dropwise to the mixture. An oil was produced immediately which was shaken out with CH₂Cl₂. After the CH₂Cl₂ was distilled off, 30.4 g. of a light yellow oil remained. The yield was 80.6 of theory.

Analysis. C₁₇H₂₁ N₆S (mol wt.=341): Calc. (percent): C, 59.8; H, 6.1; N, 24.6; S, 9.4. Found (percent): C, 59.5; H, 6.0; N, 24.3; S, 9.3.

This method can be used to convert all the monomercapto triazines mentioned herein into the corresponding sulfenamides of the general formula

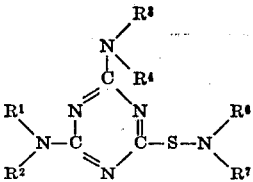

For example, the following sulfenamides were produced starting from 2-ethylamino- and 2-diethylamino-4-diethylamino-6-mercapto triazine.

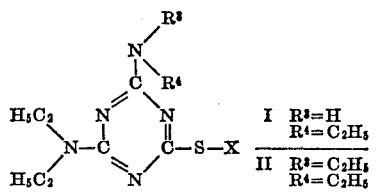

| X | Appearance | Empirical formula | Analysis, percent N, calc. | N, found |
|---|---|---|---|---|
| I ..... N(C₂H₅)₂ | Oil (yellow) | C₁₃H₂₆N₆S | 28.2 | 28.0 |
| I ..... NH-C₆H₁₁ | ...do... | C₁₅H₂₈N₆S | 25.9 | 25.9 |
| I ..... N(C₆H₁₁)(C₆H₁₁) | Oil (brown) | C₂₁H₃₈N₆S | 20.7 | 20.5 |
| I ..... N(morpholinyl with H O) | ...do... | C₁₃H₂₄N₆SO | 26.9 | 26.6 |
| I ..... N(piperidinyl with H) | ...do... | C₁₄H₂₆N₆S | 27.1 | 27.0 |
| II ..... NH-CH₂-C₆H₅ | Oil (yellow) | C₁₆H₂₄N₆S | 23.3 | 23.1 |

The following examples illustrate how the interaction constant $\alpha_F$ can be influenced by the use of mercapto triazines with various substitutents. The mercapto triazines used therein and referred to by code numbers are identified as follows:

V 33 = 2-ethanolamino-4-isoproylamino-6-mercapto-triazine
V 35 = 2-ethylamino-4-diethylamino-6-mercapto-triazine
V 67 = 2,4-bis-anilido-6-mercapto-triazine
V 68 = 2,4-bis-(N-methyl-anilido)-6-mercapto-triazine
V 97 = 2,4-bis-diethylamino-6-mercapto-triazine
V 102 = 2-diethanolamino-4-anilido-6-mercapto-triazine
V 103 = 2,4-bis-ethanolamino-6-mercapto-triazine
V 104 = 2,4-bis-diethanolamino-6-mercapto-triazine
V 105 = 2,-diethylamino-4-anilido-6-mercapto-triazine
V 114 = 2,4-bis-ethylamino-6-mercapto-triazine
V 128 = 2-ethylamino-4-diethylamino-6-cyclohexylsulfenamido-triazine
V 129 = 2,4-bis-diethylamino-6-cyclohexyl-sulfenamido-triazine
V 184 = 2,4-bis-amino-6-mercapto-triazine
V 185 = 2-amino-4-ethylamino-6-mercapto-triazine
V 186 = 2-amino-4-diethylamino-6-mercapto-triazino
V 189 = 2-di-i-propylamino-4-ethylamino-6-mercapto-triazine
V 191 = 2-dicyclohexylamino-4-ethylamino-6-mercapto-triazine
V 192 = 2-di-n-butylamino-4-ethanolamino-6-mercapto-triazine
V 193 = 2-di-n-butylamino-4-n-butylamino-6-mercapto-triazine
V 194 = 2-di-n-butylamino-4-anilido-6-mercapto-triazine
V 196 = 2-anilido-4-i-propylamino-6-mercapto-triazine
V 197 = 2-anilido-4-n-butylamino-6-mercapto-triazine
V 198 = 2-N-methylanilido-4-ethylamino-6-mercapto-triazine
V 190 = 2-di-isobutylamino-4-ethylamino-6-mercapto-triazine
V 208 = 2,4-bis-ethylamino-6-cyclohexyl-sulfenamido-triazine
V 209 = 2-ethylamino-4-amino-6-cyclohexyl-sulfenamido-triazine
V 210 = 2-diethylamino-4-amino-6-cyclohexyl-sulfenamido-triazine
V 304 = 2-diethylamino-4-isopropoxy-6-cyclohexylamino-thio-triazine
V 306 = 2-amino-4-diethylamino-6-t-butylamino-thio-triazine
V 307 = 2-methylamino-4-t-butylamino-6-t-butylamino-thio-triazine
V 309 = 2-isopropylamino-4-t-butylamino-6-t-butylamino-thio-triazine
V 310 = 2-diethylamino-4-t-butylamino-6-t-butylamino-thio-triazine
V 2025 = 2,4-diamino-6-N-cyclohexyl-sulfenamido-s-triazine

DISULFIDES

V 66 = bis-(2,4-bis-diethylamino-triazine-6-yl)-disulfide
V 143 = bis-(2-ethylamino-4-diethylamino-triazine-6-yl)-disulfide
V 149 = bis-(2,4-bis-ethylamino-triazine-6-yl)-disulfide
V 183 = bis-(2,4-diamino-triazine-6-yl)-disulfide
V 187 = bis-(2-amino-4-ethylamino-6-yl)-disulfide
V 188 = bis-(2-amino-4-diethylamino-triazine-6-yl)-disulfide
V 200 = bis-(2-diethylamino-4-carbazoyl-triazine-6-yl)-disulfide
V 202 = bis-(2-ethylamino-4-phenothiazonyl-triazine-yl)-disulfide
V 204 = bis-(2-di-i-propylamino-4-ethylamino-triazine-6-yl)-disulfide
V 205 = bis-(2-diethylamino-4-methoxy-propylamino-triazine-6-yl)-disulfide
V 206 = bis-(2-dibutylamino-4-anilido-triazine-6-yl)-disulfide
V 207 = bis-(2-ethylamino-4-benzylamino-triazine-6-yl)-disulfide
V 313 = bis-(2-isopropylamino-4-t-butylamino-triazine-6-yl)-disulfide
V 314 = bis-(2-amino-4-t-butylamino-triazine-6-yl)-disulfide

EXAMPLE 1

The mercapto triazine compounds were used for vulcanization in the following mixture:

butadiene styrene rubber containing 23.5% styrene: 100 g.
high abrasion furnace black ("HAF"): 40 g.
mercapto triazine compound: 5 mmoles
sulfur: Variable from 1.98-2.17 g.

In order to provide strict comparability, the same crosslinking density was provided in all vulcanizates by varying the quantity of sulfur.

The following $\alpha_F$ values were found:

V 35  $\alpha_F = 2.25 \cdot 10^{-2}$
V 33  $\alpha_F = 2.17 \cdot 10^{-2}$
V 114 $\alpha_F = 2.03 \cdot 10^{-2}$
V 102 $\alpha_F = 2.44 \cdot 10^{-2}$
V 143 $\alpha_F = 1.85 \cdot 10^{-2}$
V 186 $\alpha_F = 1.82 \cdot 10^{-2}$
V 194 $\alpha_F = 1.94 \cdot 10^{-2}$
V 97  $\alpha_F = 2.62 \cdot 10^{-2}$
V 193 $\alpha_F = 1.72 \cdot 10^{-2}$
V 191 $\alpha_F = 1.94 \cdot 10^{-2}$
V 184 $\alpha_F = 2.08 \cdot 10^{-2}$
V 190 $\alpha_F = 1.96 \cdot 10^{-2}$ V 189 $\alpha_F = 1.98 \cdot 10^{-2}$
V 198 $\alpha_F = 1.92 \cdot 10^{-2}$
V 202 $\alpha_F = 1.98 \cdot 10^{-2}$
V 200 $\alpha_F = 2.73 \cdot 10^{-2}$
V 205 $\alpha_F = 1.95 \cdot 10^{-2}$
V 206 $\alpha_F = 1.92 \cdot 10^{-2}$
V 204 $\alpha_F = 2.03 \cdot 10^{-2}$
V 207 $\alpha_F = 2.35 \cdot 10^{-2}$
V 188 $\alpha_F = 1.77 \cdot 10^{-2}$
V 208 $\alpha_F = 1.77 \cdot 10^{-2}$
V 209 $\alpha_F = 1.63 \cdot 10^{-2}$
V 210 $\alpha_F = 1.87 \cdot 10^{-2}$
V 187 $\alpha_F = 1.44 \cdot 10^{-2}$
V 149 $\alpha_F = 2.37 \cdot 10^{-2}$
V 66 $\alpha_F = 2.02 \cdot 10^{-2}$
V 2025 $\alpha_F = 1.63 \cdot 10^{-2}$
V 129 $\alpha_F = 1.95 \cdot 10^{-2}$ When the conventional accelerator, mercapto benzothiazole, was used instead of the mercapto triazines, the $\alpha_F$ value was $1.69 \cdot 10^{-2}$, whereby the use of stearic acid and zinc oxide does influence the cross-linking yield but not the $\alpha_F$ value.

EXAMPLE 2

(a) The following natural rubber mixtures were used:

natural rubber: 100 g.
high abrasion furnace black: 40 g.
zinc oxide: 3 g.
stearic acid. 2 g.
mercapto triazine compound: 5 mmoles.
sulfur: Variable from 1.26–4.95 g.

The sulfur quantity was varied to provide the same cross-linking density in all of the vulcanizates and also the same as in the preceding example.

The following $\alpha_F$ values were found:

V 35 $\alpha_F = 1.74 \cdot 10^{-2}$
V 33 $\alpha_F = 1.52 \cdot 10^{-2}$
V 114 $\alpha_F = 2.65 \cdot 10^{-2}$
V 102 $\alpha_F = 1.27 \cdot 10^{-2}$
V 143 $\alpha_F = 1.62 \cdot 10^{-2}$
V 186 $\alpha_F = 1.64 \cdot 10^{-2}$
V 190 $\alpha_F = 2.59 \cdot 10^{-2}$
V 189 $\alpha_F = 3.32 \cdot 10^{-2}$
V 192 $\alpha_F = 1.82 \cdot 10^{-2}$
V 187 $\alpha_F = 1.63 \cdot 10^{-2}$
V 149 $\alpha_F = 2.24 \cdot 10^{-2}$
V 66 $\alpha_F = 2.81 \cdot 10^{-2}$
V 2025 $\alpha_F = 2.47 \cdot 10^{-2}$
V 129 $\alpha_F = 2.88 \cdot 10^{-2}$ When the conventional accelerator, mercapto benzothiazole was used instead of the mercapto triazines, the $\alpha_F$ value was $1.36 \cdot 10^{-2}$. It is evident that a strong increase can be achieved in the interaction constant $\alpha_F$ by selection of suitable substituents in the mercapto triazine.

(b) The following 1,4-cis-polybutadiene mixtures were used:

1,4-cis-polybutadiene: 100 g.
high abrasion furnace black: 40 g.
Zinc oxide: 3 g.
Stearic acid: 2 g.
Mercaptotriazine compound: 5 mmol.
Sulfur: 7.5 mmol.

The following $\alpha_F$ values were found:

V 186 $\alpha_F = 2.15 \cdot 10^{-2}$
V 193 $\alpha_F = 2.39 \cdot 10^{-2}$
V 191 $\alpha_F = 2.32 \cdot 10^{-2}$
V 184 $\alpha_F = 3.09 \cdot 10^{-2}$
V 194 $\alpha_F = 2.37 \cdot 10^{-2}$
V 190 $\alpha_F = 2.33 \cdot 10^{-2}$
V 189 $\alpha_F = 2.11 \cdot 10^{-2}$
V 198 $\alpha_F = 2.08 \cdot 10^{-2}$
V 196 $\alpha_F = 2.08 \cdot 10^{-2}$
V 200 $\alpha_F = 2.94 \cdot 10^{-2}$
V 183 $\alpha_F = 3.19 \cdot 10^{-2}$
V 210 $\alpha_F = 2.58 \cdot 10^{-2}$ When the conventional accelerator, mercapto benzothiazole, was used instead of the mercapto triazines, the $\alpha_F$ value was 1.91. It is evident that, also, in the case of 1,4-cis-polybutadiene, a strong increase in the interaction constant $\alpha_F$ can be achieved by selection of suitable substituents on the mercapto triazines.

The following examples illustrate that important service properties of the vulcanizates can be influenced by selection of the substituents on the mercapto triazines:

EXAMPLE 3

5 mmoles of sulfur and 7.5 mmoles of the mercapto triazines were employed in a mixture of 100 wt.-parts of butadient styrene rubber with 50 wt.-parts of high abrasion furnace black in the presence of zinc oxide and stearic acid. The mixtures were vulcanized at 160° C. for 60 minutes. The following values were found for the modulus at 300% elongation.

| | With ZnO and stearic acid (kp./cm.²) | Without ZnO and stearic acid (kp./cm.²) |
|---|---|---|
| V 35 | 173 | 175 |
| V 97 | 127 | 145 |
| V 102 | 107 | |
| V 103 | 134 | 86 |
| V 104 | (¹) | 143 |
| V 105 | 132 | 146 |
| V 67 | 137 | 125 |
| V 68 | 107 | 131 |

¹ Not measurable.

NOTE.—kp.=kiloponds.

EXAMPLE 4

Similar results are obtained with finely divided silicas as fillers. The mercapto triazines were used in equimolecular dosages (5 mmoles) and sulfur was used in a dosage of 7.5 mmoles in mixtures of 100 wt.-parts of a butadiene-styrene rubber with 50 wt.-parts of finely divided silica.

The following modulus 300% values were measured in the vulcanizates:

Kp./cm.²
V 67 _____ 77
V 68 _____ 72

The following example illustrates the considerable improvement in the service properties of vulcanizates which can be achieved with the mercapto triazines:

EXAMPLE 5

The technological properties of vulcanizates obtained with conventional mixtures are compared with those attained with the following mercapto triazines.

The following recipes were used:

| | Grams | |
|---|---|---|
| | Mixture I | Mixture II |
| Butadiene-styrene rubber containing 23.5% styrene | 100 | 100 |
| Finely divided silica | 50 | 50 |
| Zinc oxide | 2 | |
| Stearic acid | 3 | |
| Sulfur | 1.75 | 1.28 |
| Diphenyl guanidine | 1.6 | |
| Dibenzothiazyl disulfide | 2.4 | |
| V 103 | | 0.58 |

The following technological property values were measured in the vulcanizates obtained with 60 minutes' vulcanization at 160° C.:

| | Mixture I | Mixture II |
|---|---|---|
| Tensile strength, kp./cm.² | 209 | 253 |
| Modulus 300%, kp./cm.² | 61 | 75 |
| Rebound, percent | 34 | 44 |
| Tear resistance, kp./cm. | 14.5 | 35.9 |

As can be seen, a drastic improvement in tensile strength, rebound and tear resistance is attained with a slightly higher modulus 300% value despite the reduction of the quantity of accelerator employed to 1/7 with simultaneous saving on sulfur.

When the quantity of sulfur is increased to 2.56 g. in mixture II, the modulus 300% value attained is 133 kp./cm.$^2$ a value which cannot be obtained with any conventional accelerator. These values are at the level customary for carbon black filled rubbers.

A saving in vulcanizing agents can also be achieved with carbon black filled natural rubber vulcanizates.

EXAMPLE 6

A natural rubber mixture with 37 wt.-parts of a semi-reinforcing carbon black (as is used for tire carcasses) per 100 wt.-parts rubber was on one hand vulcanized with a mixture of 0.14 wt.-parts 2-mercapto benzothiazole, 1.25 wt.-parts of dibenzothiazyl disulfide, 3 wt.-parts zinc oxide, 2 wt.-parts stearic acid, and 2.7 wt.-parts of sulfur and, on the other hand, with a mixture of 0.5 wt.-parts of V 35, 3 wt.-parts zinc oxide, 2 wt.-parts stearic acid and 1.5 wt.-parts of sulfur. Both vulcanizates had the same tensile strength, modulus 300%, rebound elasticity and permanent deformation. Upon aging in air at 100° C. for 4 days, the elongation at break of the vulcanizate obtained with the conventional accelerators was reduced from 548% to 230% and that of the vulcanizate obtained with the mercapto triazine was only reduced from 555% to 320%, showing the considerably greater resistance to aging of the latter.

EXAMPLE 7

Similar savings in vulcanizing agents can be achieved with the sulfenamide V 128.

A mixture such as is used for carcasses of truck tires consisting of 100 wt.-parts of a mixture of 80% natural rubber and 20% of isotactic polyisoprene filled with 28.5 wt.-parts of a semi-reinforcing carbon black and 0.6 wt.-parts of mercapto benzothiazole, 1.15 wt.-parts mercapto benzothiazole disulfide, and 2.5 wt.-parts of sulfur (mixture I) was compared with one in which the accelerators had been replaced with 0.7 wt.-parts of V 128 and the sulfur content had been reduced to 1.5 wt.-parts (mixture II).

After a vulcanization period of 40 minutes, the vulcanizates had the following properties:

|  | I | II |
|---|---|---|
| Tensile strength kp./cm.$^2$ | 189 | 187 |
| Modulus 300%, kp./cm.$^2$ | 57 | 71 |
| Permanent deformation after break, percent | 13 | 12 |

The mercapto triazines have the advantage over the conventional accelerators that with them higher vulcanization temperatures can be used. It is known that upon increase of the vulcanization temperature, for example, from 145° C. to 160° C. the modulus 300% value decreases which can be traced back to a lower yield in cross-linking points at higher temperatures.

EXAMPLE 8

A mixture consisting of 100 wt.-parts of a rubber mixture of 75% of oil extended butadiene styrene rubber and 25% of polybutadiene rubber, 60 wt.-parts of ISAF furnace black, 0.9 wt.-parts stearic acid, 0.5 wt.-parts zinc oxide, 10 wt.-parts aromatic processing oil, 3 wt.-parts antioxidant (N - phenyl-N'-isopropyl-p-phenylene - diamine), 1.2 wt.-parts sulfur, and 1 wt.-part of benzothiazyl-2-cyclohexylsulfenamide (mixture I) was compared with one in which the benzothiazyl-2-cyclohexylsulfenamide was replaced with the same quantity of V 35 (Mixture II). The mixtures were vulcanized for 20 minutes once at 145° C. and another time at 160° C.

|  | Vulc. temp., °C. | Modulus 300%, kp./cm.$^2$ |
|---|---|---|
| Vulcanizate of mixture I | 145 | 74 |
|  | 160 | 62 |
| Vulcanizate of mixture II | 145 | 73 |
|  | 160 | 75 |

No decrease in cross-linking yield caused by the higher vulcanization temperature is apparent with the mercapto triazine compound, whereas the modulus 300% of the vulcanizate with the benzothiazyl - 2 - cyclohexylsulfenamide decreases substantially with a vulcanization temperature of 160° C.

A further advantage of the mercapto triazine compounds employed according to the invention is the substantial increase in resistance to crack growth of the vulcanizates produced therewith when subjected to dynamic stresses.

EXAMPLE 9

Two vulcanizates of 100 wt.-parts SBR, 50 wt.-parts high abrasion furnace black, 2.0 wt.-parts stearic acid, 3.0 wt.-parts zinc oxide and 1.75 wt.-parts and 1.28 wt.-parts of sulfur, respectively, one with the conventional accelerator benzothiazyl-2-cyclohexylsulfenamide and the other with V 35, were adjusted to about the same modulus 300% and their resistance to crack growth measured.

|  | Vulcanizate I [1] | Vulcanizate II [2] |
|---|---|---|
| Modulus 300%, kp./cm.$^2$ | 189 | 181 |
| Break after bends | 27,000 | 130,000 |

[1] 1.25 wt.-parts benzothizayl-2-cyclohexylsulfenamide; 1.75 wt.-parts sulfur.
[2] 2.28 wt.-parts V 35; 1.28 wt.-parts sulfur.

One of the most important service properties of a vulcanizate is its resistance to abrasion which stands in close relationship to the polymer-filler interaction constant $\alpha_F$. The abrasion resistance can be increased considerably with the mercapto triazines employed according to the invention.

EXAMPLE 10

The abrasion resistance of vulcanizates produced from the following recipes were tested:

|  | Mixtures (wt.-parts) | | | |
|---|---|---|---|---|
|  | I | II | III | IV |
| SBR | 100 | 100 | 100 | 100 |
| High abrasion furnace black | 50 | 50 | 50 | 50 |
| Stearic acid | 2 | 2 | 2 | 2 |
| Zinc oxide | 3 | 3 | 3 | 3 |
| Aromatic processing oil | 10 | 10 | 10 | 10 |
| Sulfur | 1.75 | 1.3 | 1.0 | 1.28 |
| Benzothiazyl-2-cyclohexylsulfenamide | 1.25 |  |  |  |
| V 104 |  | 1.3 |  |  |
| V 35 |  |  | 1.3 | 0.57 |

The mixtures were vulcanized for 80 minutes at 160° C. and their relative abrasion resistance measured (H. Westlinning, Kautschuk & Gummi, 20, 1967, No. 1, pages 5–8).

Relative abrasion resistance
Mixture I _____ 100
Mixture II _____ 120
Mixture III _____ 131
Mixture IV _____ 162

It is known that vulcanizates with finely divided silicas as fillers only have very low abrasion resistances. Such abrasion resistance can be improved considerably by replacement of the conventional accelerators with the mercapto triazines so that practically no differences exists between the abrasion resistance of vulcanizates filled with carbon black and those filled with finely divided silicas.

EXAMPLE 11

The vulcanizates out of the following three compositions were tested:

|  | Mixtures (in parts by weight) | | |
|---|---|---|---|
|  | I | II | III |
| Butadiene styrene rubber containing 23.5% styrene | 100 | 100 | 100 |
| High abrasion furnace black | 50 | | |
| Finely divided silica | | 50 | 50 |
| Zinc oxide | 3 | 3 | |
| Stearic acid | 2 | 2 | |
| Sulfur | 1.75 | 1.75 | 1.28 |
| Benzothiazyl-2-cyclohexylsulfenamide | 1.25 | | |
| Dibenzothiazyl disulfide | | 2.4 | |
| Diphenylguanidine | | 1.6 | |
| V 35 | | | 2.28 |

The relative abrasion resistance of the vulcanizates was as follows:

| | Relative abrasion resistance |
|---|---|
| Mixture I | 100 |
| Mixture II | 43 |
| Mixture III | 98 |

The following examples illustrate that the action of the mercapto triazines is not limited to natural rubber and butadiene rubber, but also is present in all rubber polymers of the most varied chemical compositions.

EXAMPLE 12

| | Wt.-parts |
|---|---|
| Butyl rubber | 100 |
| High abrasion furnace black | 50 |
| Stearic acid | 2.0 |
| Zinc oxide | 3.0 |
| V 143 | 1.13 |
| Sulfur | 2.0 |

Vulcanization temperature: 150° C.
Vulcanization period: 80 minutes.

The following properties were obtained in the vulcanizate:

| | |
|---|---|
| Tensile strength, kp./cm.$^2$ | 164 |
| Modulus 300%, kp./cm.$^2$ | 56 |
| Rebound, percent | 8 |
| Shore hardness | 57 |
| Tear resistance, kp./cm. | 17 |

EXAMPLE 13

| | Wt.-parts |
|---|---|
| Ethylenepropylene terpolymer rubber containing cyclopentadiene | 100 |
| High abrasion furnace black | 50 |
| Stearic acid | 2.0 |
| Zinc oxide | 3.0 |
| V 143 | 1.13 |
| Sulfur | 1.5 |

Vulcanization temperature: 150° C.
Vulcanization period: 120 minutes.

The following properties were obtained in the vulcanizates:

| | |
|---|---|
| Tensile strength, kp./cm.$^2$ | 156 |
| Modulus 300%, kp./cm.$^2$ | 62 |
| Rebound, percent | 34 |
| Shore hardness | 62 |
| Tear resistance, kp./cm. | 17 |

EXAMPLE 14

| | Wt.-parts |
|---|---|
| Acrylonitrile rubber | 100 |
| High abrasion furnace black | 50 |
| Stearic acid | 2.0 |
| Zinc oxide | 3.0 |
| V 143 | 1.13 |
| Sulfur | 2.0 |

Vulcanization temperature: 150° C.
Vulcanization period: 80 minutes.

Properties of vulcanizates

| | |
|---|---|
| Tensile strength kp./cm.$^2$ | 253 |
| Modulus 300%, kp./cm.$^2$ | 248 |
| Rebound, percent | 19 |
| Shore hardness | 78 |
| Tear resistance, kp./cm. | 8 |

EXAMPLE 15

| | Wt.-parts |
|---|---|
| 1,4-cis-polybutadiene | 100 |
| High abrasion furnace black | 50 |
| V 143 | 1.13 |
| Sulfur | 1.75 |

Vulcanization temperature: 150° C.
Vulcanization period: 80 minutes.

Properties of vulcanizate

| | |
|---|---|
| Tensile strength, kp./cm.$^2$ | 182 |
| Modulus 300%, kp./cm.$^2$ | 91 |
| Rebound, percent | 45 |
| Shore hardness | 62 |
| Tear resistance, kp./cm. | 18 |

EXAMPLE 16

| | Wt.-parts |
|---|---|
| 1,4-cis-polyisoprene | 100 |
| High abrasion furnace black | 50 |
| Stearic acid | 2 |
| Zinc oxide | 3 |
| V 143 | 1.13 |
| Sulfur | 2.5 |

Vulcanization temperature: 150° C.
Vulcanization period: 100 minutes.

Properties of vulcanizate

| | |
|---|---|
| Tensile strength, kp./cm.$^2$ | 178 |
| Modulus 300, kp./cm.$^2$ | 153 |
| Rebound, percent | 39 |
| Shore hardness | 68 |
| Tear resistance, kp./cm. | 12 |

The following example illustrates the desirable effects regarding heat generation during the vulcanization. Since there is a close relationship between degree of cross-linking and heat build-up under dynamic deformation, the resistance against a chemical reversion under the influence of the vulcanization temperature is shown by the following measurements.

The properties of different vulcanizates vulcanized as indicated at temperatures from 145 to 175° C. appear in greater detail from the following example:

EXAMPLE 16A

A natural rubber base composition comprising 100 wt-parts natural rubber, 40 wt-parts of a reinforcing carbon black, 3 wt-parts of zinc oxide, 2 wt-parts of stearic acid, 2.5-wt-parts of sulfur and 0.5 wt.-part of CBS (N-cyclohexyl-2-benzothiazolsulfenamide) [Mixtures I] were compared with the same mixture, but, containing 0.5 wt.-part of the triazine above identified as V 143 instead of CBS (Mixture II). Both mixtures were vulcanized at temperatures between 145° C. and 175° C. The following results were obtained regarding the heat bulid-up under dynamic deformation:

| | Heat build-up (° C.) | |
|---|---|---|
| Vulcanization temperature, ° C. | Mixture I (prior art) | Mixture II (invention) |
| 145 | 37 | 31 |
| 155 | 44 | 36 |
| 165 | 55 | 44 |
| 175 | 75 | 48 |

EXAMPLE 17

Elastomeric compositions consisting of 200 wt.-parts natural rubber, 50 wt.-parts of a reinforcing carbon black, 3 wt.-parts zinc oxide, 2 wt.-parts stearic acid, 2.5 wt.- parts of the sulfenamide identified above as V 307 (Mixture I) and of the sulfenamide V 309 respectively (Mixture II). The following properties were found in specimens vulcanized at 150° C. for 40 minutes:

|  | Mixture I | Mixture II |
|---|---|---|
| Tensile strength kp./cm.$^2$ | 259 | 258 |
| Modulus 300%, kp./cm.$^2$ | 165 | 180 |
| Shore hardness | 69 | 71 |
| Rebound, percent | 45 | 45 |

EXAMPLE 18

A natural rubber composition as formulated in Example 17 was vulcanized with 0.5 wt.-part each, of the disulfides V 282 (Mixture I), V 283 (Mixture II), V 285 (Mixture III), V 286 (Mixture IV) and V 315 (Mixture V). The following properties were found in the mixtures which had been vulcanized at 150° C. at the time indicated in the preceding example:

|  | Mixtures | | | | |
|---|---|---|---|---|---|
|  | I | II | III | IV | V |
| Tensile strength, kp./cm.$^2$ | 238 | 238 | 222 | 245 | 215 |
| Modulus 300%, kp./cm.$^2$ | 162 | 169 | 157 | 167 | 177 |
| Shore hardness | 72 | 73 | 73 | 74 | 72 |
| Rebound, percent | 41 | 41 | 39 | 44 | 42 |

V 282 = 2-ethylamino-4-diethylamino-6-benzyldithio-triazine
V 283 = 2-ethylamino-4-diethylamino-6-ethyldithio-triazine
V 285 = 2-amino-4-diethylamino-6-benzyldithio-triazine
V 286 = -amino-4-diethylamino-6-ethyldithio-triazine
V 315 = bis-(2-diethylamino-4-t-butylamino-triazine-6-yl)-disulfide

EXAMPLE 19

Elastomeric compositions consisting of 100 wt.-parts butadiene-styrene elastomer, containing 25% styrene 50 wt.-parts of a reinforcing carbon black, 2 wt.-parts stearic acid, 3 wt.-parts zinc oxide, 2 wt.-parts sulfur, were vulcanized with 1 wt.-part, each, of the disulfides V 314 (Mixture I) and V 313 (Mixture II). The following properties were obtained after vulcanization for 60 minutes at 160° C.:

|  | Mixture I | Mixture II |
|---|---|---|
| Tensile strength, kp./cm.$^2$ | 250 | 220 |
| Modulus 300%, kp./cm.$^2$ | 154 | 162 |
| Shore hardness | 70 | 72 |
| Rebound, percent | 41 | 39 |

EXAMPLE 20

Elastomeric compositions of the same contents as stated in the preceding example were vulcanized with 1 wt.-part, each, of the sulfenamides V 304 (Mixture I), V 306 (Mixture II), V 309 (Mixture III) and V 310 (Mixture IV). The following properties were determined after vulcanization at 160° C. for the indicated time:

|  | Mixtures | | | |
|---|---|---|---|---|
|  | I | II | III | IV |
| Tensile strength, kp./cm.$^2$ | 231 | 261 | 247 | 274 |
| Modulus 300%, kp./cm.$^2$ | 185 | 184 | 165 | 180 |
| Shore hardness | 70 | 71 | 71 | 69 |
| Rebound, percent | 37 | 39 | 38 | 40 |

It will be understood that the high activity of the mercaptotriazine compositions and their derivatives is also of great advantage for the industrial use in other respects, as appears from the following examples:

EXAMPLE 21

The conventional accelerators MBTS [1] and MBT [2] were

[1] MBTS: dibenzthiazyldisulfide.
[2] MBT: 2-mercaptobenzthiazole.

replaced by the same amount of V 143 in a natural rubber stock such as used for tire carcasses. The rubber stock consisted of 100 wt.-parts natural rubber, 45 wt.-parts of a semi-reinforcing carbon black, 3 wt.-parts zinc oxide, 2 wt.-parts stearic acid, 2 wt.-parts sulfur and 0.8 wt.-parts of the accelerator MBTS and 0.4 wt.-parts of the accelerator MBT (mixture I).

In the mixture II, containing the same amount of the accelerator V 143, the carbon black content was reduced from 45 wt.-parts to 25 wt.-parts in order to reduce the high modulus at 300 caused by the high polymer-filler interaction constant $\alpha_F$ in the presence of V 143 to the level of the modulus obtained in a mixture with the conventional accelerators. Specimens vulcanized at 140° C. for 40 minutes showed the following properties:

|  | Mixture I (prior art) | Mixture II (invention) |
|---|---|---|
| Tensile strength, kp./cm.$^2$ | 194 | 235 |
| Modulus 300%, kp./cm.$^2$ | 137 | 130 |
| Rebound, percent | 50 | 71 |
| Shore hardness | 65 | 60 |
| Heat build-up (° C.) | 45 | 18 |

The low heat build-up of the vulcanizates out of the mixture II containing V 143 in consequence of the reduction of the carbon black content, will particularly be noted. This low heat build-up under dynamic deformation results in a considerably cooler run for auto tires and, accordingly, in better stress properties and a longer life time.

EXAMPLE 22

A rubber stock consisting of 100 wt.-parts ethylenepropylene terpolymer elastomer ("Epsyn 55") with ethylidene-norbornene as the ter component, 50 wt.-parts of a reinforcing furnace carbon black of a specific surface area of 80 m.$^2$/g., 1 wt.-part stearic acid, 5 wt.-parts zinc oxide, 10 wt.-parts of aromatic plasticizer oil and 1.25 wt.-parts sulfur were vulcanized at 160° C. for the same time as in previous examples with 1.1 wt.-parts of the additive V 210.

The vulcanizates showed the following properties:

Tensile strength, kp./cm.$^2$ _____ 174
Modulus 300%, kp./cm.$^2$ _____ 148
Shore hardness _____ 68
Rebound, percent _____ 45

EXAMPLE 23

A composition consisting of 100 wt.-parts of a solvent-polymerized butadiene-styrene block polymer containing about 20% styrene, 50 wt.-parts of a high abrasion furnace black, 2 wt.-parts stearic acid, 3 wt.-parts zinc oxide, and 2 wt.-parts sulfur, was vulcanized for 60 minutes at 160° C. with 1 wt.-part V 210. The following properties were determined in the vulcanizates:

Tensile strength, kp./cm.$^2$ _____ 188
Modulus 300% kp./cm.$^2$ _____ 170
Shore hardness _____ 81
Rebound, percent _____ 40

If the additive V 210 is replaced by the conventional accelerator CBS (N-cyclohexyl-2-benzothiazol-sulfenamide) the modulus under the same vulcanization conditions is only 152 kp./cm.$^2$ The following tables show the improvement accomplished with the process of the present invention in regard to certain filler-containing elastomer compositions as compared with the lack of particular improvement in connection with chloroprene rubbers designated as neoprene, because these cannot be vulcanized with sulfur as is possible with the other elastomers.

The attached Table I shows the Mooney scorch values and the modulus values at 300% elongation for the polychloroprene. In the tests there were used conventional vulcanizing agents, to wit, ethylene thiourea (trade name "NA 22" or "Vulkacit NVP"). These tests were compared with tests where the triazine derivative V 143 of the present invention was used. The test results show that with the two conventional cross-linking agents "NA 22" and "Vulkacit NP," about twice thte modulus could be obtained than with the triazine derivative V 143.

Table II shows similar comparisons for a natural rubber stock, polyisoprene, polybutadiene and a styrene-butandiene blend. For the comparison tests, there was used in this case the triazine derivative V 143 which was contrasted with a corresponding disulfide from the thiazol accelerator group, dibenzthiazyldisulfide. The V 143 compound is bis-(2-ethylamino - 4 - diethylaminotriazine-6-yl)-disulfide.

The test results show that with all these elastomers the Mooney scorch times are longer and therefore the margin of safety during the processing is higher in case of use of the triazine accelerator V 143. Besides, in all these cases the tensile strength and the modulus at 300% elongation is higher. This shows that the V 143 compound results in a highly improved cross-linking action.

In general it can be said that polychloroprene requires an entirely different vulcanization system than the halogen-free elastomer, and that unexpectedly and surprising the present invention therefore obtains an impressive improvement in these halogen-free elastomers.

The test results appear from the following two tables:

Table I shows the results with the neoprene rubber stock, and Table II shows the results with the halogen-free rubber stocks in which the additives of the present invention accomplish a highly beneficial result.

TABLE I

|  | Mixture | | | |
| --- | --- | --- | --- | --- |
|  | I | II | III | IV |
| Polychloroprene rubber (Neoprene) | 100 | 100 | 100 | 100 |
| Semi-reinforcing carbon black | 29 | 29 | 29 | 29 |
| Stearic acid | 0.5 | 0.5 | 0.5 | 0.5 |
| Zinc oxide | 5 | 5 | 5 | 5 |
| Magnesium oxide | 2 | 2 | 2 | 2 |
| Ethylenethiourea |  | 0.5 |  |  |
| Thioalkylperhydrotriazine |  |  | 0.5 |  |
| V 143 |  |  |  | 0.5 |
| Mooney scorch time (min.) | 11 | 8 | 8 | 12 |
| Mooney cure time (min.) | 29 | 13 | 12 | 22 |
| Vulcanization, 153° C./60 min.: |  |  |  |  |
| Modulus 200%, kp./cm.² | 27 | 61 | 62 | 34 |
| Modulus 300%, kp./cm.² | 57 | 135 | 130 | 70 |
| Shore hardness | 51 | 58 | 60 | 54 | ing a vulcanizable composition containing (a) at least one halogen-free polymeric elastomer selected from the group consisting of natural rubber, polyisoprenes, polybutadienes, copolymers of butadiene and styrene, copolymers of butadiene and acrylonitrile, copolymers of isoprene and isobutylene, copolymers of ethylene, propylene and a diene hydrocarbon compound, oil extended synthetic elastomers of the forementioned types of elastomers, mixtures of said elastomers and mixtures of rubber with one or more of said elastomers, (b) at least one reinforcing filler, (c) sulfur and (d) at least one substituted s-triazine compound adapted to modify the reinforcing effect of the filler, the said s-triazine compound being present in an amount equivalent to between 0.1 and 50 mmol. per 100 parts by weight of the polymeric elastomer and having the formula

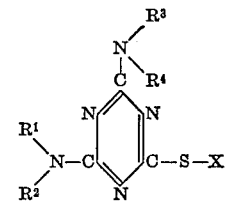

wherein $R^1$ and $R^3$ are each selected from the group consisting of hydrogen, alkyl, alkenyl, cycloalkyl, phenyl, aralkyl and substituted alkyl, alkenyl, cycloalkyl, phenyl, aralkyl wherein the substituents are selected from the group consisting of —OH, —OR and —CN, R being alkyl with up to 18 carbon atoms, $R^2$ and $R^4$ are each selected from the group consisting of hydrogen, alkyl, alkenyl, cycloalkyl, phenyl, aralkyl and substituted alkyl, alkenyl, cycloalkyl, phenyl and aralkyl, wherein the substituents are selected from the group consisting of —OH, —OR and —CN, R being alkyl with up to 18 carbon atoms, X is

$R^6$ being selected from the group consisting of hydrogen, alkyl, aralkyl and cycloalkyl and $R^7$ being selected from the group consisting of alkyl, aralkyl and cycloalkyl and

TABLE II

|  | Mixture | | | | | | | |
| --- | --- | --- | --- | --- | --- | --- | --- | --- |
|  | I | II | III | IV | V | VII | VII | VIII |
| Natural rubber | 100 |  |  |  |  |  |  |  |
| 1,4-cis-polyisoprene |  |  | 100 |  |  |  |  |  |
| 1,4-cis-polybutadiene |  |  |  |  | 100 |  |  |  |
| SBR copolymer |  |  |  |  |  |  | 100 |  |
| HAF carbon black | 50 | 50 | 50 | 50 | 50 | 50 | 50 | 50 |
| Zinc oxide | 3 | 3 | 3 | 3 | 3 | 3 | 3 | 3 |
| Stearic acid | 2 | 2 | 3 | 3 | 2 | 2 | 2 | 2 |
| Dibenzothiazyldisulfide | 0.5 |  | 0.6 |  | 0.9 |  | 1 |  |
| V 143 |  | 0.5 |  | 0.6 |  | 0.9 |  | 1 |
| Sulfur | 2.5 | 2.5 | 2.5 | 2.5 | 1.5 | 1.5 | 2 | 2 |
| Mooney scorch time (min.) | 15 | 27 | 14 | 21 | 17 | 23 | 18 | 23 |
| Mooney cure time (min.) | 18 | 29 | 19 | 23 | 23 | 27 | 25 | 28 |
| Vulcanization, 150° C/40 min.: |  |  |  |  |  |  |  |  |
| Tensil strength, kp/cm.² | 176 | 243 | 147 | 246 | 121 | 141 | 234 | 257 |
| Modulus 300%, kp/cm.² | 120 | 167 | 89 | 171 | 71 | 80 | 157 | 169 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A method of improving properties of vulcanized filled elastomeric compositions which comprises vulcanizwherein $R^6$ and $R^7$ together may also form a cycloaliphatic ring having from 5 to 7 carbon atoms in the ring and from 5 to 10 carbon atoms, including lower alkyl, attached to the ring, or wherein $R^6$ and $R^7$ may be linked by a member of the group consisting of —O—, —S— and

and wherein the number of carbon atoms in $R^1$, $R^2$, $R^3$, $R^4$, $R^6$ and $R^7$ is as follows:

alkyl up to 18 carbon atoms
alkyl up to 18 carbon atoms
cycloalkyl from 5 to 7 carbons atoms
aralkyl from 7 to 9 carbon atoms.

2. The method of claim 1, in which the reinforcing filler is a carbon black having a particle size from 100 to 5000 A. and is added to the composition in an amount from 5 to 200 weight-parts per 100 weight-parts of rubber polymer.

3. The method of claim 1, in which the reinforcing filler is a finely divided white filler having a particle size from 100 to 3500 A. and is added to the composition in an amount from 5 to 200 wt.-parts per 100 wt.-parts of elastomer.

4. The method of claim 1, wherein the filler is a silica.

5. The method of claim 1, in which the vulcanizable composition contains between 1 and 300 mmol. of sulfur per 100 g. of elastomer.

References Cited

UNITED STATES PATENTS

| | | | |
|---|---|---|---|
| 2,804,450 | 8/1957 | Naylor | 260—92.3 |
| 2,892,807 | 6/1959 | Sellers et al. | 260—41.5 R |

ALLAN LIEBERMAN, Primary Examiner

H. H. FLETCHER, Assistant Examiner

U.S. Cl. X.R.

260—33.6 AQ, 249.8, 763, 765, 791, 42.37, 42.38